UNITED STATES PATENT OFFICE.

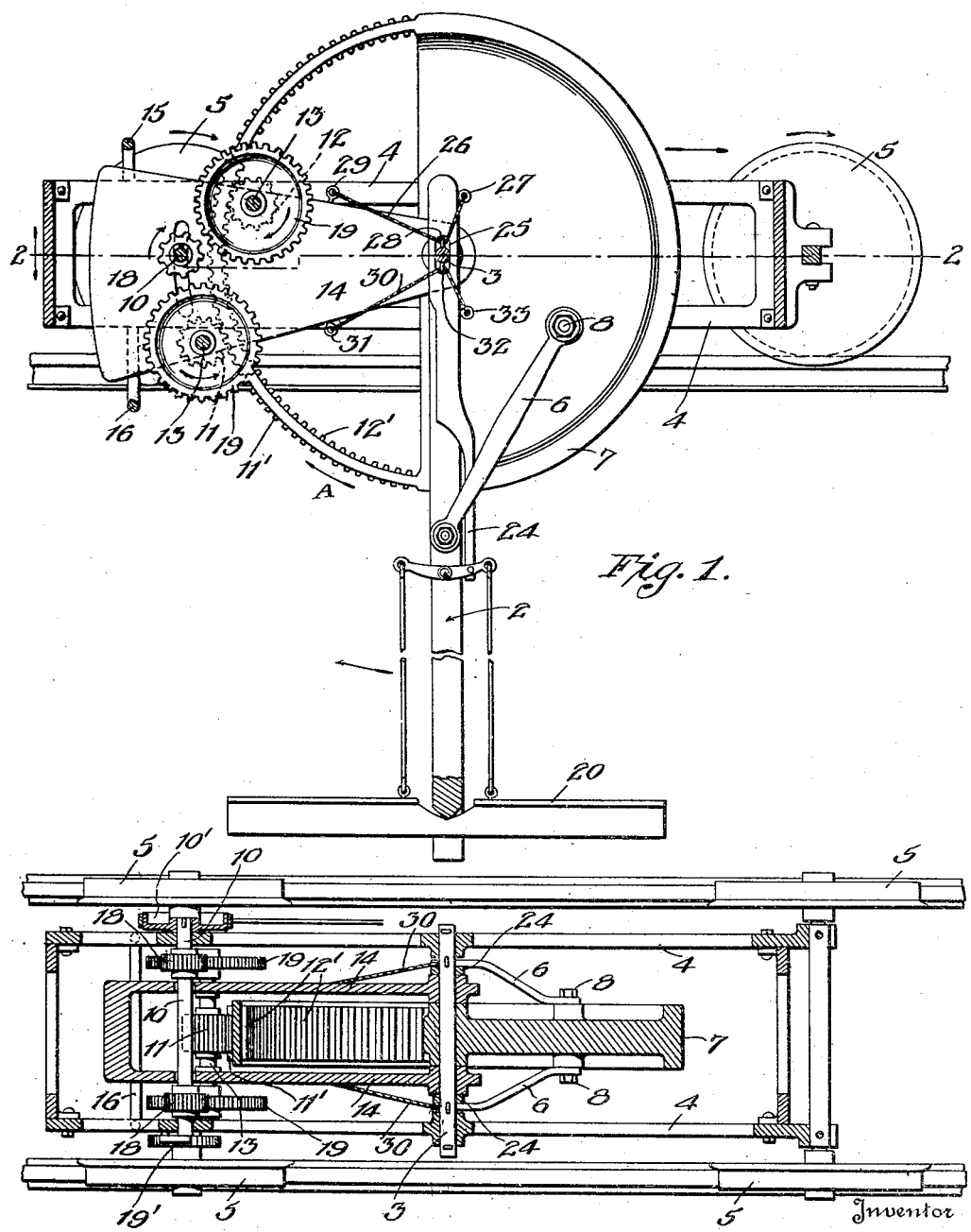

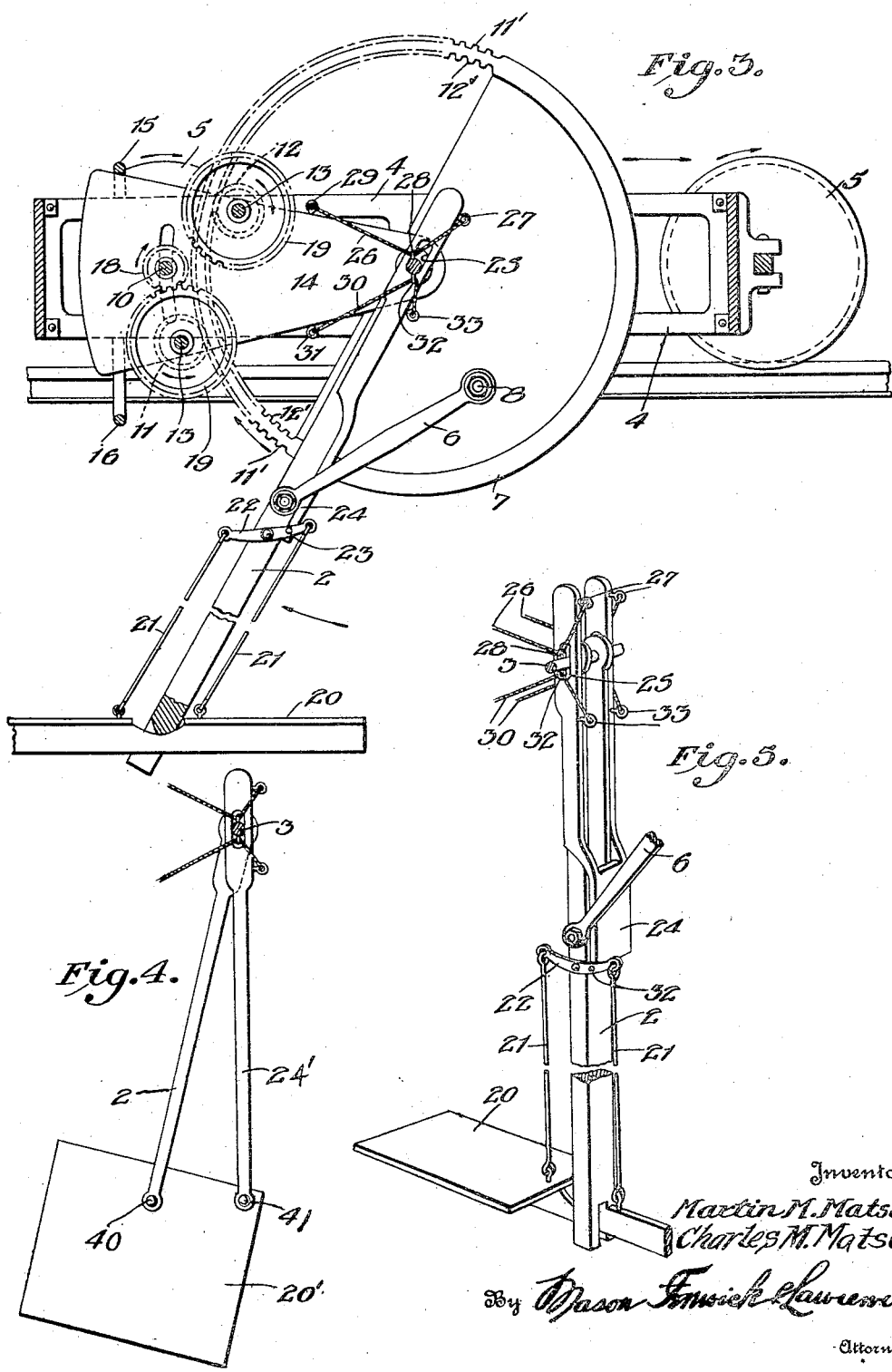

MARTIN M. MATSON AND CHARLES M. MATSON, OF MABSCOTT, WEST VIRGINIA.

MOTOR.

1,246,766.  Specification of Letters Patent.  Patented Nov. 13, 1917.

Application filed December 30, 1916. Serial No. 139,987.

*To all whom it may concern:*

Be it known that we, MARTIN M. MATSON and CHARLES M. MATSON, citizens of the United States, residing at Mabscott, in the county of Raleigh and State of West Virginia, have invented certain new and useful Improvements in Motors; and we do hereby declare the following to be a full, clear, and exact description of the invention, such as will enable others skilled in the art to which it appertains to make and use the same.

This invention relates to motors, and particularly to a type of motor involving an oscillating driver and means operative thereby to translate the oscillatory movement thereof into a rotary motion of a driven member in one direction during the opposite oscillations of the motor oscillating element.

The object of the present invention is to provide a motor capable of utilizing force acting upon an oscillating or swinging member to drive a driven member in one direction, and has for its further object to provide for the propulsion or operation of a motor through an oscillating member, whereby the force acting through the oscillations may be utilized in a rotary member driven in one direction, the power being delivered from the driven or rotary member as may be desired.

It is a further object of the present invention to provide a swinging or oscillating motor having an impelling element which may be operated by force derived from any suitable source, such as by manual power, or tide, or wind power, or the combination of the force of wind and gravity, or liquid motion and gravity.

With these and other objects in view, as will be readily manifest to those skilled in the art, the present invention involves an oscillating member, a member to be driven thereby, and means for selectively connecting the oscillatory or driving member so that its oscillations are translated into a movement in one direction, and embodiments of our invention are illustrated in the accompanying drawings in which:

Figure 1 is a side elevation of the motor as applied in combination as the driving or impelling unit of a truck, partly in section.

Fig. 2 is a plan view of the apparatus as shown in Fig. 1, and partly in section on line 2—2, Fig. 1.

Fig. 3 is a side elevation, partly broken away to illustrate the transmitting mechanism of the apparatus.

Fig. 4 is a detailed side elevational view of the lower portion of the oscillating pendulum or impelling member as adapted for automatic control.

Fig. 5 is a perspective view of the pendulum and its platform and connected push rod.

The motor as contemplated by our invention and herein illustrated may be utilized for various purposes in which force derived from various sources acting upon an oscillating member may be transmitted to and delivered from a driven member preferably having rotative motion in one direction, and while the motor is shown in the present instance as adapted for service in the operation of a wheeled truck mounted upon a trackway, it is to be understood that the motor may be used for any other purposes where power may be desired. It is further understood that the driven truck illustrated in the present invention may be adaptable for several purposes, such, for instance, as in transportation where the truck may be utilized as a carrier, or may be utilized as the motor for drawing or propelling vehicles or other containers, and, indeed, motors or cars may be arranged upon a series of parallel tracks and when operated individually by their respective motors may form a very practicable and novel amusement apparatus in which each of the vehicles would be operated by its passenger or passengers in contest with the others upon their respective tracks.

In the illustrated embodiment of the motor, a pendulum or swinging member 2 is utilized and mounted at its upper end upon a pivot 3 arranged on a suitable support shown in the present instance as the frame 4 of a truck having track wheels 5—5 at opposite sides in pairs on the ends of the frame. The pendulum or oscillating driving element 2 is shown as rigidly connected through any suitable connecting means, as a link 6, to an oscillating member in the form herein illustrated of a wheel 7, to which the upper end of the link is eccentrically connected as at 8, the wheel 7 being loosely mounted and appropriately journaled upon the fulcrum 3 of the pendulum 2, and having at one side suitable driving connection to be described hereinbelow. Mounted at a suitable location upon the truck 4 there is a transverse shaft 10 upon which one pair of track wheels 5 are secured and adapted to be driven by the rotation of the shaft 10 when this is connected through suitable selective mechanism to the transmitting mechanism operated by the driver 7.

Since the member 7 is adapted to be driven by any oscillating movement to and fro by the force applied to and acting upon the swinging pendulum, various forms of transmitting mechanism may be employed to transmit the force from the device 7 to the shaft 10 to be driven. A simple form of this transmitting mechanism is shown in the present embodiment as comprising a set of pinions 11 and 12, one of which is adapted to engage the exterior teeth 11' forming a portion of the oscillating member 7, and the latter being adapted to engage with an internal segment of a gear 12' so that as the member 7 oscillates in the direction of the arrow indicated at A, Fig. 1, the pinion 12 will be rotated in a similar direction, while the pinion 11 is rotated in the opposite direction, and for the purpose of selecting the proper movement or portion of the cycle of operation of the driving member 7 suitable selective means are employed to control the actuation of the shaft 10 by the driving pinion 12.

In this instance the pinions 11 and 12 are mounted upon respective shafts 13 suitably spaced apart in parallel position upon a shifting frame 14, one end of which is freely pivoted upon the pivot or journal 3 of the pendulum 2, and the forward end of which is adapted to swing upwardly or downwardly against respective stops 15 and 16 so as to limit the movement of the oscillating carrier frame 14. The pinions 11 and 12 are each mounted upon respective shafts, and these may be provided at suitable locations with intermediate gears 19 adapted to be brought into mesh with respective pinions 18 on the driven shaft 10 as determined by the selection of one or the other of the driving pinions to impart motion from the driving member 7 to the said shaft.

As illustrated in Fig. 2, the means for controlling the selection of the oscillation, and thereby controlling the meshing of the intermediate gears 19 with their respective pinions 18 on the shaft 10 to be driven, takes the form in this illustration of a platform 20 pivoted upon the lower end of the pendulum 2, and which is connected by suitable links or appropriate devices 21 to a lever 22 also pivoted upon the pendulum 2, and one arm of which is connected at 23 to a controlling device 24 in the form of a link which is extended upwardly along the pendulum 2 and is provided with a slot 25 at its upper end which straddles the pivot 3 of the pendulum. This selecting device, including the tiltable platform 20 and the push rod 24, may be connected by any suitable means to the oscillating carrier or frame 14 upon which the pinions 11 and 12 and their shafts are mounted so as to cause one or the other of the intermediate gears 18 to move into mesh with and drive the shaft 10. A simple form of device for thus controlling the selective shifting of the carrier and frame 14 comprises in this illustration a flexible link 26 connected at one end as at 27 to the upper end of the push rod 24 and which passes through a guide in the form of an eye or staple 28 adjacent the fulcrum 3, and thence passes forwardly and connects at 29 to the upper portion of the carrier or selector 14. A similar device 30 is connected to the lower side of the carrier or selector 14 at 31, and passes through an eye or guide 32 and is secured below the pivot 3 as at 33 to the push rod of the selector device.

The operation of the device above described is substantially as follows: Assuming that the pendulum has been swung in Fig. 1 to the left of the view, then when downward pressure is applied upon the left end of the tiltable platform 20 at the bottom of the pendulum 2, this force tends, through the connection 21, to force the push rod 24 of the selecting device upwardly and through the connecting link or device 26 force the carrier frame 14 upwardly about the pivot 3 so as to bring the lower intermediate gear 19 into mesh with the pinion 18 on the shaft 10, and during the continued downward swinging movement of the pendulum after these gears are intermeshed, the force acting through the external gear and driving pinion 11 causes this to rotate and in turn drives the intermediate gear 19 which thus rotates the shaft 10 through its pinion 18. The continued oscillation of the pendulum 2 to the right acts rotatively through the meshed mechanism upon the shaft 10 until the end of the cycle of the pendulum to the right, whereupon upon the reverse movement of the latter and a downward pressure upon the tiltable platform 20 when at the right hand side of Fig. 1, the position of the selector frame or carrier 14 is reversed by the downward pull through the links 21, the push rod 24 and its connection 30 to the said frame 14, whereupon the upper pinion 12 engaging the internal gear 12' will rotate the shaft 10 through its pinion 18 and the intermediate gear 19 when these are brought into mesh. The gear 19 of the pinion 12 is held in mesh with the pinion 18 on shaft 10 so long as the pendulum 2 is swinging to the left as viewed in Fig. 1, and from this it will be seen that shaft 10 is driven uniformly in one direction by the selection of the alternate oscillations of the driving member or device 7 during the swing of the pendulum 2.

It is understood that in the form shown in Figs. 1, 2 and 3, power is derived through manual force when the operators are standing upon the tiltable platform 20, and in addition to their power the force of gravity acts also through the pendulum upon the transmitting mechanism.

In some instances it may be desirable to operate the motor from other or natural forces, such for instance as the wind or as by power derived from the force of waves or tide, in which event, in order to render the actuation of the selecting device entirely automatic, there is illustrated in Fig. 4 a form of selector control in which there is connected to the bottom of the pendulum 2 an oscillating element 20′ which is pivoted at 40 to the lower end of the pendulum 2, and the connector or push rod 24′ is connected at the pivot 41 to the swinging element 20′ at the bottom of the pendulum, and its upper end is slotted and crosses pivot 3 of the oscillating driver as illustrated in Fig. 1, the difference being that in this instance, as the pendulum reverses at one end of its swing to move in the opposite direction, the device 20′ will be acted upon by the force operating upon the motor to push the push rod 24′ upward or to pull it downward according to the direction of the swing, and thus automatically change the position of the selecting device or frame 14 controlling the actuation of the shaft 10.

For the purpose of balancing the application of force to the driven shaft 10, the intermediate gears 19 are shown as arranged in pairs on opposite sides of the intermediate driving member 7 and suitable checking devices may be employed to prevent the rotation of the shaft 10 in a reverse direction to that in which it is intended to have it propelled normally, a simple form of check device comprising ratchet pawls or the like as illustrated at 19′. When the apparatus is used in transportation service or upon inclined ways, a brake mechanism, which is illustrated generally at 10′, may be provided so as to apply braking action upon the shaft when it is necessary.

It is to be understood that while there is shown in the present instance a set of shift gears which are adapted to be brought alternately into driving mesh with the shaft 10 to be driven, that this may be variously altered, modified, or reconstructed, so that any suitable means may be employed for selectively connecting the oscillating or driving member 7 to the shaft 10 so that the latter is driven in one direction by selective co-action with the oscillatory element of the device so that power is transmitted from the latter during each of its oscillations to and fro to the driven shaft.

So long as an excess of force is applied to one end of platform 20 or 20′ this latter will be prevented from tilting during an oscillation of arm 2 and therefore the carrier 14 is prevented from shifting. The platform will not always remain horizontal but will or may assume any angle relative to the horizontal as determined by its operative relation to the pendulum.

When rack 12′ is going up pinion 12 is driven clockwise, and when rack 11′ is going down pinion 11 is driven clockwise, hence shaft 10 is always turned in one direction by the gears 19—19.

What is claimed as new is:

1. A motor comprising a shaft, an oscillating driver, floating reverse gears driven by said driver in opposite directions during each oscillation thereof, and means for selectively coupling said gears to said shaft to drive the latter in a given direction during the oscillations of the driver.

2. A motor comprising an oscillating power member, a set of floating rotary members operative thereby during its oscillations, and a power transmitting element driven by said rotary members during movements thereof to drive said element in one direction only.

3. A motor comprising an oscillating driver, a shaft to be driven thereby, and mechanism for selectively connecting said driver and said shaft to rotate the latter in one direction during the opposite oscillations of said driver and including an oscillating segment, reverse gears meshing therewith, and a floating carrier for said gears.

4. A motor comprising an oscillating pendulum, segmental gears connected thereto, a driven shaft, a set of transmitting gears operative by said segmental gears for impelling said shaft, and means controlled from said pendulum for controlling the actuation of said shaft by said transmitting gears.

5. A motor comprising an oscillating pendulum, a driver connected thereto, a driven shaft, a set of shiftable transmitting devices operative by said driver for impelling said shaft, and shift means controlled from said pendulum for controlling the actuation of said shiftable devices.

6. A motor comprising an oscillatory pendulum, a driver connected thereto, shiftable selective gears operative by the driver, a shaft operative by said gears, and means for selectively controlling said gears.

7. A motor comprising an oscillatory pendulum, a driver connected thereto, gears operative by the driver, a shaft operative by said gears, and means for selectively controlling the actuation of the shaft by said gears, and controlled from said pendulum, the driver including internal and external segments for the gears.

8. A motor comprising a frame, a driven shaft thereon, a pendulum hung from the frame, a floating carrier hung on the axis of said pendulum and carrying means for driving said shaft and driven by said pendulum, and means for shifting said carrier to control operation of said means.

9. A motor comprising a frame, a driven shaft thereon, a pendulum hung from the frame, a floating carrier hung on the axis of the shaft, gears on said carrier to selectively drive said shaft, means secured to said pendulum for actuating said gears, and means carried by the pendulum for shifting said carrier to cause the gears to alternately drive the shaft.

10. A motor comprising a frame, a driven shaft thereon, a pendulum hung from the frame, a floating carrier hung on the axis of the shaft, gears on said carrier to selectively drive said shaft, means secured to said pendulum for actuating said gears, means carried by the pendulum for shifting said carrier to cause the gears to alternately drive the shaft and including a member pivotally hung on the lower end of the pendulum.

In testimony whereof we affix our signatures.

MARTIN M. MATSON.
CHARLES M. MATSON.

Copies of this patent may be obtained for five cents each, by addressing the "Commissioner of Patents, Washington, D. C."